July 30, 1968 R. L. GAMBLIN ET AL 3,395,395

VARIABLE WEIGHTED THRESHOLD ELEMENT SYSTEM

Filed Oct. 22, 1965 2 Sheets-Sheet 1

INVENTORS.
RODGER L. GAMBLIN
CYRIL J. TUNIS

BY Ronald J. Clark
ATTORNEY

United States Patent Office 3,395,395

Patented July 30, 1968

3,395,395

VARIABLE WEIGHTED THRESHOLD ELEMENT SYSTEM

Rodger L. Gamblin, Vestal, and Cyril J. Tunis, Endwell, N.Y., assignors to International Business Machines Corporation, Armonk, N.Y., a corporation of New York Filed Oct. 22, 1965, Ser. No. 500,882

8 Claims. (Cl. 340—172.5)

ABSTRACT OF THE DISCLOSURE

A multi-state memory system is described wherein a torodial ferrite element is set to various states of remanent magnetism to produce a corresponding impedance to a microwave signal traversing a helical coil wound about the toroid.

Figure 1:
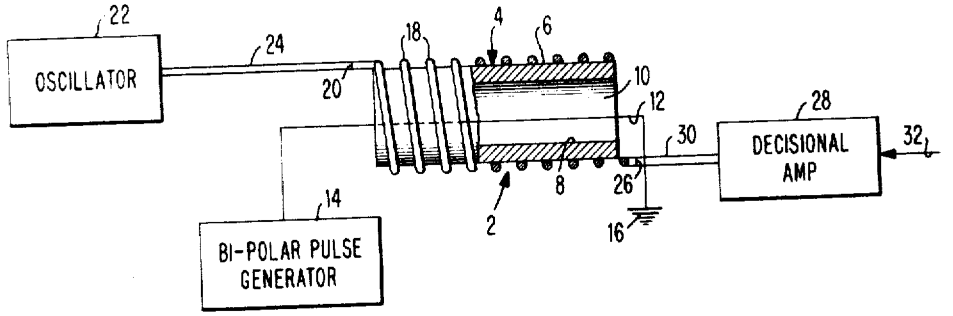

This invention relates to adaptive machines and, more particularly, to a variable weighted threshold element system employing a plurality of ferrite cores that are incrementally switched in response to high frequency pulses.

Variable weighted threshold elements comprise the basic building block for one form of learning machine. The basic variable weight memory element working satisfactorily in the learning machine has several operating characteristics. One of these characteristics is to provide an output signal when interrogated by an input sampling pulse, which output is some variable level depending upon the previous history of the device. The amplitude of the output should be changeable in small increments by a second input whereby, the variable nature of the output signal is completely under control of the input signal. The internal state of the device should also be constant when no pulses are put on the second input line. Present devices exhibiting these characteristics are relatively bulky, or have relatively slow operating speeds or are unreliable, or are expensive, or are limited by a combination of these undesirable characteritics. The present device is small, accurate, inexpensive, and has a fast operating speed.

It is an object of the instant invention to provide a device exhibiting the general characteristic of a variable weight memory element suitable for use in a learning machine.

It is a further object of the instant invention to provide a variable weight memory element which exhibits incremental switching with an attendant relative increase or decrease of its output, because of the partial magnetic switching of a magnetic oxide core which forms the central memory element of the device.

It is a still further object of the instant invention to provide a variable weight memory element which employs microwave signals as a means of sampling the value of the partially switched memory element.

It is a still further object of the instant invention to provide a variable weight memory element operating to indicate its previous history by passing various levels of microwave energy depending upon its incrementally switched magnetic state.

It is a further object of the instant invention to provide an adaptive threshold logic system employing a plurality of microwave absorption variable weight memory elements selectively energized by additional microwave responsive gating circuits and coupled together to indicate the sum of level stepping pulses.

These and other objects are achieved by the use of a basic variable weight memory element comprising a piece of ferrite material having a central bore through which an external drive line passes and having an outer surface upon which a helical coil is tightly wound. A microwave oscillator is attached to one end of the helical coil and a sense amplifier which is amplitude responsive is connected to the other end of the helical coil. When the core is set in one definite state of remanent magnetization by means of a large long length pulse on the external drive line and the helix is operatively connected to carry a microwave signal, a certain output level passes through the helix to the amplitude responsive sense amplifier. When however, a small very fast electrical pulse is passed through the core on the drive line, the state of the core partially charges to a lower remanent state than previously set by the large long pulse. When the next microwave signal is sent through the helix a change in the amplitude is noted by the amplitude responsive sense amplifier. A series of such pulses on the drive line sets the core to any intermediate magnetization state which may then be decremented as well as incremented by supplying an opposite polarity short pulse signal on the drive line so that the amplitude of the microwave signal may be increased or decreased at will. This change in the amplitude reflects the history of the core insofar as it has experienced a partial switching signal. If no pulses appear on the drive line the amplitude of the microwave signal remains constant so that the output from the amplitude sensitive sense amplifier remains constant.

Figure 2:
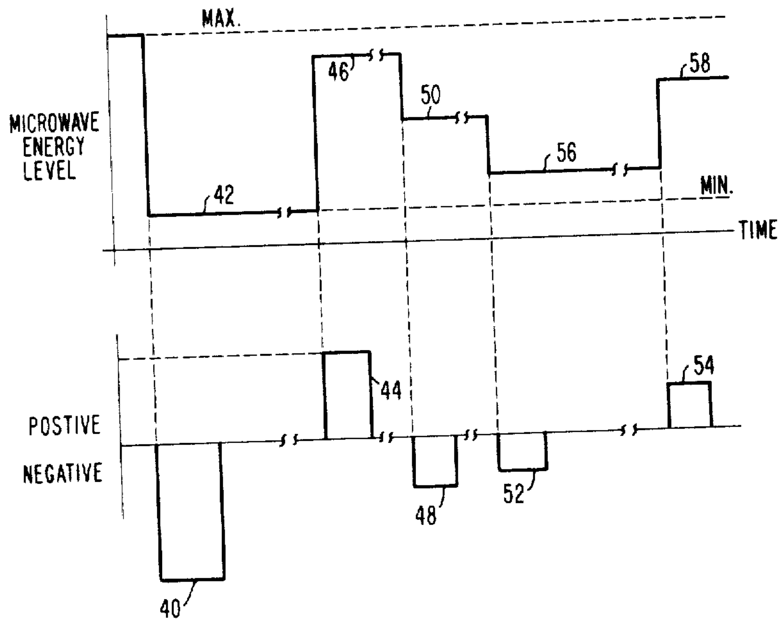
Figure 3:
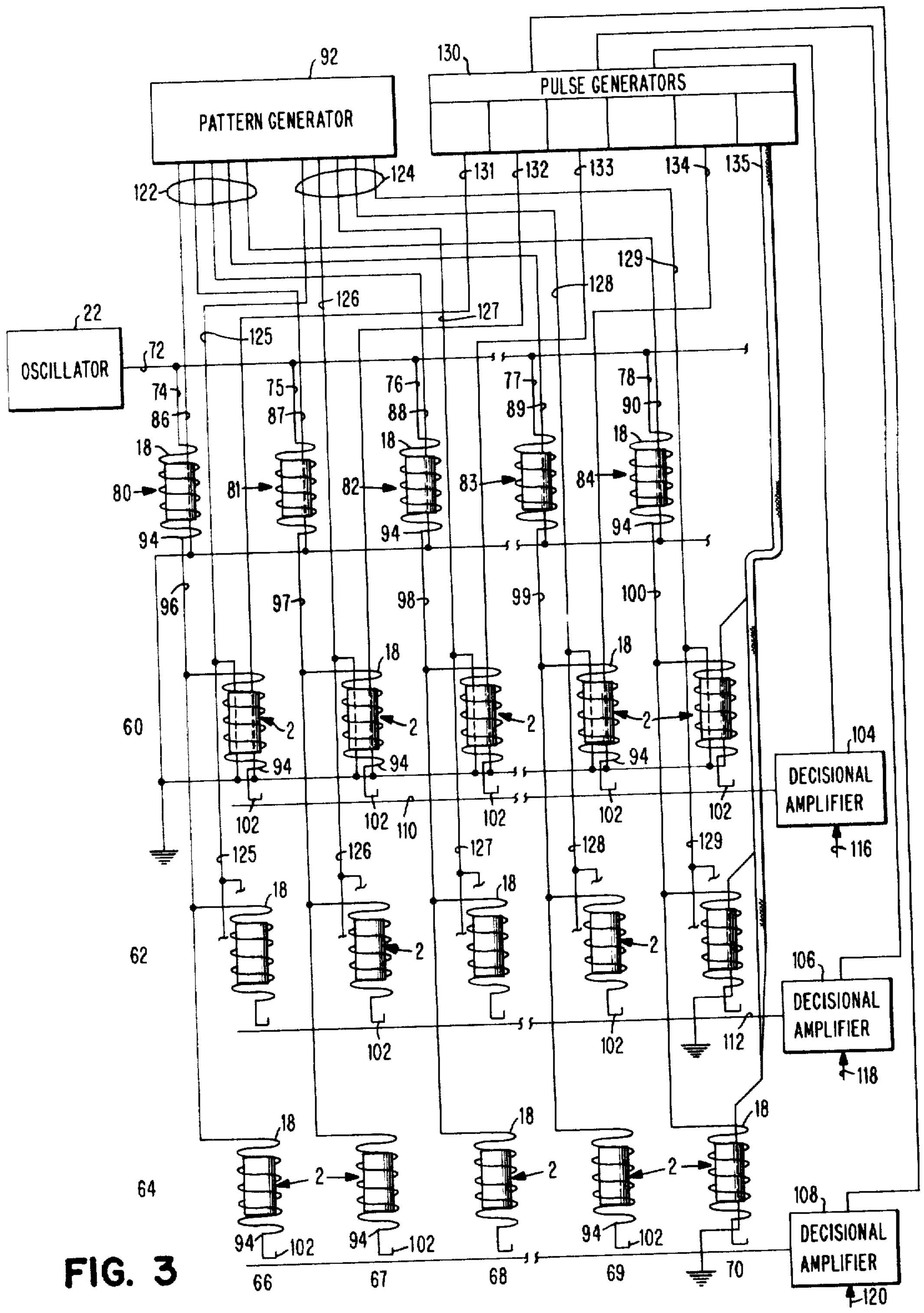

The foregoing and other objects, features and advantages of the invention will be apparent from the following more particular description of a preferred embodiment of the invention, as illustrated in the accompanying drawings; wherein FIG. 1 is a schematic view showing the basic variable weight memory element;

FIG. 2 shows a pair of graphs indicating the change in the level of the output signal passing through a basic variable weight threshold element depending upon the polarity and strength of partial switching drive pulses, and FIG. 3 shows a group of memory elements connected together to show an elementary learning machine.

The same numerals are used to identify similar elements in the several views.

A learning machine generally demands a large number of threshold elements and weighting elements for its implementation, since such a learning machine may be employed to recognize the time-frequency patterns of various spoken words, or other such complex input signals reducible to a series of binary patterns. In one version of a learning system, each bit repreesnting the pattern is connected to all weighting elements of all the threshold circuits. Therefore, if a binary one appears at one position in the pattern, the weighting elements connected to that position will deliver some variable output to its respective threshold circuit depending on its internal state. The voltage level of its output signal is called its "weight." The outputs from a set of such elements are then summed into the threshold circuit and compared to a fixed level of voltage in the machine and a decisional output binary "one" appears when the output sum from the elements is greater than or equal to the fixed level. A decisional binary "zero" appears if the output sum is less than the fixed level. These decisional binary signals are then either used to feed another set of threshold elements or used directly to represent a particular coded classification of the input pattern. In general, the "weights" or internal states of the weighting elements are determined for a group of patterns by allowing the network to go through "training." A pattern is presented to the input of the machine and a classification is presented at the output, when this classification is correct for the particular input pattern, the weights are not changed. If the classification presented by the machine is incorrect, however, the weights are changed in such a way that the voltage levels which contribute thereto are accordingly decremented or incremented so as to change the classification, i.e. the states of the incorrect threshold circuits. The learning procedure is arranged so that subsequent to this procedure, the machine will "recognize" or classify future patterns with a high degree of accuracy.

Referring to FIG. 1, there can be seen a schematic view of a basic microwave weighting element 2 used to instrument the above described learning machine. The element 2 comprises a ferrite toroid 4 having an outer surface 6 and an inner wall 8. The inner wall 8 forms an axial bore 10 through which a drive line 12 is threaded. The drive line 12 is connected to a bi-polar pulse generator 14 and to a ground connection 16. A helical coil 18 is wrapped around the outer surface 6 of the toroid. A first end 20 of the coil 18 is connected to a microwave oscillator 22 by a first strip line 24. A second end 26 of the coil 18 is connected to a decisional amplifier or threshold circuit 28 by a second strip line 30. A second comparison signal is applied to the amplifier over a line 32.

The term ferrite is used to refer to that class of metals which possess extremely high resistivity and tensor permeability whereby, in combination, the class exhibits a gyromagnetic resonant absorption effect. The term toroid is used to describe that group of geometric shapes which can be circularly magnetized. An essential element of circular magnetization is a toroid having a bore that acts as an air gap for preventing non-azimuthal magnetization. The bore need not be a central bore lying on the axis of its associated toroid and the toroid need not have the shape of a cylindrical core. For example, an askew bore in a non-cylindrical toroid would give satisfactory results. However, a cylindrical toroid with an axial bore is shown since their use results in the best embodiment presently known.

Briefly the single variable weight threshold element shown in FIG. 1, operates in the following manner. A microwave signal samples the state of the toroid 4 according to the phenomenon described by R. L. Gamblin and Philip A. Lord in their co-pending application S.N. 502,008, filed Oct. 22, 1965, and assigned to the assignee of the instant invention. The drive line 12 is employed to transmit two types of drive pulses. The first type is a pulse of relatively long duration, one microsecond, of relatively high current level sufficient to totally switch the toroid 4 to its stable remanent state of magnetization wherein, in combination with the helical coil 18, the microwaves passing through the helix are absorbed. The second type of drive pulses is a pulse of either polarity of reduced duration and reduced energy level sufficient to partially switch the toroid 4 whereby, the microwave absorption phenomenon is incrementally changed.

In a ferrite or other ferromagnetic substances, there are small islands of material in which all electron spins are oriented in the same direction. These islands, which are called "domains," are separated from each other by regions in which adjacent electrons vary in direction. In demagnetized material, the domains are pointed in all directions so that there is no net magnetization. If the material is magnetized by means of an external field, all the domains' magnetization tends to line up with the external field and the domain walls change position to allow a minimum of energy change. A toroidal core of ferromagnetic material when magnetized in one direction by a strong external field has all its domains line up in one azimuthal direction. When the external field is removed, the magnetic fields of the domains tend to keep them aligned much as magnetized nails line up head to point. As a result, the core maintains the domain orientation and overall magnetization when the external field is removed. It is in this state that maximum transmission of microwave energy through the helix is obtained. When the toroidal core of ferromagnetic material is magnetized in its other directions by an equally strong field, all its domains now line up in the opposite azimuthal direction. In this state a minimum level of microwave signals pass through the helix. When a partially switching pulse is applied to the drive line, some of the domains are rotated so that there is a change in the level of microwave transmission over the helix since the newly rotated domains, responding to the partial switching pulse, influence the microwave energy level passing through the helix. Most importantly, since the toroid is magnetized in an azimuthal direction and since the domains are the affected property of the toroid, the new state of magnetization is stable and permanent and persists even after the partially switching drive pulse is removed.

Referring to FIG. 2, an illustration and description of the effect of partial switching pulses on the energy level of the microwave signal passing to the amplifier 28 is shown. The graph shown is only by way of example, since the energy level reaching the amplifier is dependent on many variables. Two of which among others, are the composition of the toroid and the physical dimensions of the toroid and helix. Additionally, the level and the duration of the partial switching pulses depend upon machine design and the pattern to be sensed.

A first total switching pulse 40 of negative polarity switches the core into its absorption state whereby a minimum level 42 of microwave energy reaches the decisional amplifier 28. A positive going pulse 44 of substantially 200 milliamperes and 100 nanoseconds rotates a sufficient number of "domains" to alter its state of magnetization whereby an increased level 46 of microwave energy reaches the amplifier. An additional negative going pulse 48 of about the same duration but less current returns a portion of the rotated "domains" to their starting position whereby, the microwave energy is reduced to a level 50. Additional pulses 52 and 54 change the level of the microwave signal reaching the amplifier to the levels 56 and 58 respectively. It should be noted that each time a partial switching pulse is applied to the drive wire 12 its associated toroid is changed to a new stable state. There is no tendency for the magnetic state to change upon the removal of the partial switching pulses of either polarity, since all states achieved are stable when operating according to the phenomenon of gyromagnetic absorption. A high degree of control in making slight changes is achieved by using pulses having the same current level and altering the time during which these pulses remain on.

Referring to FIG. 3 there can be seen a schematic diagram of an elementary learning machine employing a plurality of microwave variable weighted threshold elements 2 arranged in horizontal rows 60, 62 and 64 and vertical columns 66 through 70. Only a few representative rows and columns are shown since a fully developed learning machine would require many more elements. An oscillator 22 generates a microwave signal substantially matching the integral gyromagnetic resonant absorption frequency of the elements 2 for sampling the total microwave transmission associated with each row. A suitable oscillator is identified as a Gunn Effect oscillator completely described in a U.S. Patent 3,365,583 assigned to the assignee of the instant invention. A strip line 72 transmits the microwave signal to a plurality of branch lines 74 through 78. Means, not shown, equally divides the energy on the strip line among the branch lines. A plurality of magnetic switches 80 through 84 are connected to the branch lines 74 through 78 respectively. Each of the switches employs a drive winding 86 through 90 respectively. The drive windings are connected to a pattern generator 92. A suitable magnetic switch is completely described in a co-pending application by R. L. Gamblin, Philip A. Lord and Mitchell P. Marcus, S.N. 502,005, filed Oct. 22, 1965, and assigned to the assignee of the instant invention. Briefly, each magnetic switch is similar to the variable weight threshold elements except that pulses applied to the respective drive windings are total switching signals effecting maximum microwave transmission or minium microwave transmission over its associated helical coil 18. The lower end 94 of each coil 18 associated with the switches 80 through 84 is connected to a second strip line 96 through 100 respectively. An element 2 in each of the rows 60, 62 and 64 is connected to each of the strip lines 96 through 100 respectively. Connections are made with one end of the helical coils 22. The other end of the helical coil is connected to a directional coupler 102. The directional coupler 102 in each row transmits the microwave energy passing through the helical coil to a plurality of decisional amplifiers 104, 106 and 108, operating as threshold circuits, and associated with the rows 60, 62 and 64 by a plurality of third strip lines 110, 112 and 114 respectively. A plurality of comparison voltages are applied to the amplifiers 104, 106 and 108 by lines 116, 118 and 120 respectively.

The pattern generator 92 includes a group of switching signals 122 connected to the drive windings 86 through 90, and a group of pattern signals 124. The pattern signals 124 are applied to a plurality of drive lines 125 through 129. Each of the drive windings are connected in parallel to corresponding weighting elements 2 in each of the rows 60, 62 and 64. For clarity, the drive windings 125 through 129 are shown completely threading the elements 2 in row 60. The remaining rows are similarly threaded. A pulse generator 130 is equipped with a plurality of output signals on a plurality of lines 131 through 135 respectively. Each of the lines are shown schematically threading corresponding elements 2 in the row 60. Actually, as shown in column 70, each of the lines 131 through 135 is a multi-line cable and only a single line in each cable threads corresponding elements in the rows 60, 62 and 64. The output signals applied to each row 60, 62 and 64 reflect the output of its corresponding decisional amplifiers 104, 106 and 108 respectively.

In operation, the pattern generator furnishes a group of binary signals to its respective drive lines 124 through 129 incrementally changing the magnetic state of the elements according to the polarity of the signal. More specifically, the pattern generator may comprise a voice encoding machine and the learning machine is learning to recognize the patterns associated with definite commands. For example, the voice encoding machine generates a ten-bit binary pattern for each sample made of the voice signal. Each bit in the pattern has corresponding threshold elements in each of the rows 60, 62 and 64.

During its training period, the pattern generator not only enables certain of the magnetic switches 80 through 84 corresponding to those positions having a binary one, but also operates to enable the incrementing or decrementing of those weighting devices corresponding to those positions having a binary one therein. By designation, when the command uttered is to be recognized by the elements in row 62 yet a different row 60 gives a decisional output, the elements in row 62 receive incrementing pulses from the pulse generator 118 and the elements in the row 60 receive decrementing pulses. The purpose of these incrementing and decrementing pulses and their relationship to a learning machine during its training period is fully described in a U.S. patent application entitled "Adaptive Categorizer" by J. H. King, Jr. and Mitchell P. Marcus, S.N. 334,765, filed Dec. 31, 1963, and assigned to the assignee of the instant invention.

During the training period the correct voltage levels for the leads 116, 118 and 120 are determined. In this operation, there are as many threshold elements in each row as there are bits in a total pattern, or there are as many threshold elements in a row as there are subgroups in a pattern described by a plurality of subgroups.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A variable weight logic memory element comprising,
   - a magnetized ferrite toroid having an outer wall and a central bore and integral gyromagnetic resonant absorption frequency,
   - a helical coil wrapped around said outer wall and formed with a first end and a second end,
   - a source of microwaves connected to said first end for generating a microwave signal substantially at said frequency,
   - amplitude responsive means connected to said second end for indicating the level of said microwave signal passing through said coil,
   - a drive wire threaded through said bore, and
   - variable pulse means connected to said drive wire for incrementally altering the level of microwave signals passing through said coil.

2. A variable weight logic memory element comprising,
   - a magnetized ferrite toroid having an outer wall and an interior bore and an integral gyromagnetic resonant absorption frequency,
   - said ferrite being magnetized in an azimuthal direction,
   - a helical coil wrapped around said outer wall and formed with a first end and a second end,
   - a source of microwaves of substantially constant signal level connected to said first end for generating a microwave signal substantially at said frequency,
   - means connected to said second end for utilizing the level of microwave signals passing through said helix,
   - a drive wire threaded through said bore, and variable pulse means connected to said drive wire for incrementally altering the level of microwave signals passing through said coil.

3. A variable threshold weight logic memory system comprising,
   - a microwave absorption element having a plurality of integral stable states of magnetic domain orientation,
   - a source of microwaves,
   - a helical coil connected to said source for sampling the magnetic domain state of said element,
   - means for generating a pattern to be recognized and for changing the magnetic domain of said element according to the pattern, and
   - means connected to said coil and responsive to said microwaves for determining the domain status of said element.

4. A variable threshold weighted logic memory system comprising,
   - a microwave absorption element having a central bore and a plurality of integral stable states of magnetic domain orientation,
   - a source of microwaves,
   - a helical coil connected to said source and wrapped around said element for sampling the magnetic domain state of said element,
   - means for generating a pattern to be recognized and for changing the magnetic domains of said element according to the pattern, and
   - means connected to said coil and responsive to said microwaves for determining the domain status of said element.

5. A variable threshold weight logic memory system comprising,
   - a plurality of microwave absorption elements schematically arranged in rows and columns,
   - a source of microwaves connected in parallel to a first element in each of said columns,
   - each of said elements in said remaining columns being connected in series with a corresponding first element and being connected in parallel with its corresponding elements in the same column for receiving said microwave signals from said first element, first means for generating a pattern to be recognized, said first element in each column responsive to said pattern generator for selectively preventing and transmitting said microwaves to the remaining elements in its respective column according to said pattern, said remaining elements having a plurality of integral stable states of domain magnetization, second means responsive to said pattern generator for incrementally altering said stable states, means for recognizing said pattern, first feedback means responsive to said recognizing means for reinforcing at least one of said rows, and second feedback means responsive to said recognizing means for decrementing at least one of said rows.

6. A variable weight threshold logic memory system comprising, a plurality of microwave absorption elements schematically arranged in horizontal rows and vertical columns, a source of microwaves connected in parallel to a first element in each of said columns, each of said elements in said remaining columns being connected in series with a corresponding first element and being connected in parallel with its corresponding elements in the same column for receiving said microwave signals from said first element, first means for generating a plurality of predetermined patterns, said first element in each column responsive to said pattern generator for selectively preventing and transmitting said microwaves to the remaining elements in its respective column according to said pattern, said remaining elements having a plurality of integral stable states of domain magnetization, second means responsive to said pattern generator for incrementally altering said stable states, a plurality of threshold elements each responsive to the sum of all microwaves passing through the elements in a single row, and means for furnishing a comparison signal to each of said elements.

7. A variable weight threshold logic memory system comprising, a plurality of magnetized ferrite toroids each having an outer wall and an interior bore and an integral gyromagnetic resonant absorption frequency, a helical coil wrapped around said outer wall of each of said elements and formed with a first end and a second end, a source of microwaves connected to said first end of each of said elements for generating a microwave signal substantially at said frequency, amplitude responsive means connected to said second end of each of said elements for summing the several levels of microwave energy passing through all of said coils, a plurality of separate drive wires each threaded through a corresponding bore of one element, and a variable pulse means connected to said drive wires for incrementally and separately altering the level of microwave signals passing through each of said coils.

8. A variable weight threshold logic memory system as recited in claim 7 and further including, a feedback path from said amplitude responsive means to said variable pulse means for controlling the generation of certain of said pulses.

References Cited

UNITED STATES PATENTS

| | | | |
|---|---|---|---|
| 2,846,670 | 8/1958 | Torrey | 340—174 |
| 2,900,557 | 8/1959 | Weber et al. | 315—3.5 |
| 2,964,669 | 12/1960 | Enander | 315—3.5 |
| 3,237,161 | 2/1966 | Rabinow | 340—146.3 |
| 3,286,238 | 11/1966 | Steinbuch et al. | 340—172.5 |
| 3,295,112 | 12/1966 | Stewart | 340—173 |

ROBERT C. BAILEY, *Primary Examiner.*

R. B. ZACHE, *Assistant Examiner.*